United States Patent [19]
Niven

[11] 3,880,390
[45] Apr. 29, 1975

[54] UNIVERSAL PEGBOARD
[75] Inventor: Ronald D. Niven, Lincolnwood, Ill.
[73] Assignee: Dynagraphic Merchandising Corporation, Chicago, Ill.
[22] Filed: Nov. 8, 1973
[21] Appl. No.: 413,837

[52] U.S. Cl. ............................ 248/223; 248/DIG. 3
[51] Int. Cl. ......... A47f 5/00; E06b 7/28; A47h 1/10
[58] Field of Search ........ 248/223, 224, 225, 220.5, 248/71, 217, 304, DIG. 3

[56] References Cited
UNITED STATES PATENTS
2,759,295   8/1956   Keuls ............................ 248/DIG. 3
3,255,987   6/1966   Gatch .............................. 248/223
3,310,271   3/1967   King ................................ 248/225
3,420,482   1/1969   Taylor ............................... 248/71
3,443,783   5/1969   Fisher ........................... 248/220.5

Primary Examiner—J. Franklin Foss
Attorney, Agent, or Firm—Charles W. Rummler; John R. Diver

[57] ABSTRACT

A pegboard having a bayonet-type mount for securing the peg therein with a detent device offset from the peg on a lock block for frictionally fixing and laterally supporting the peg in the pegboard and offering the option of universal mutually orthogonal mounting thereon.

1 Claim, 8 Drawing Figures

PATENTED APR 29 1975 3,880,390
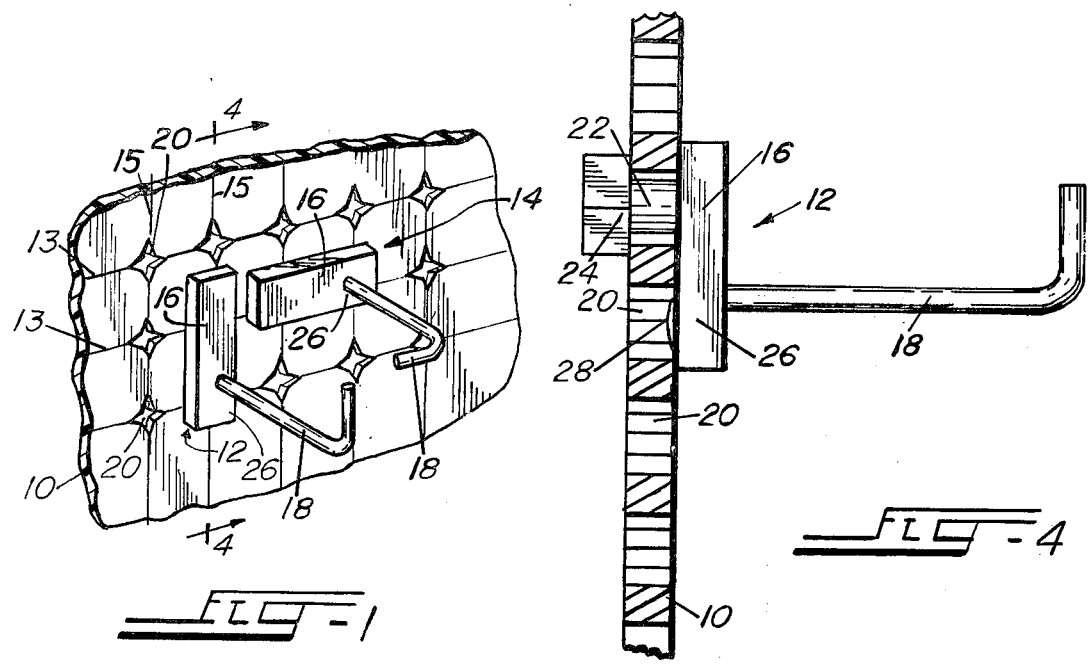
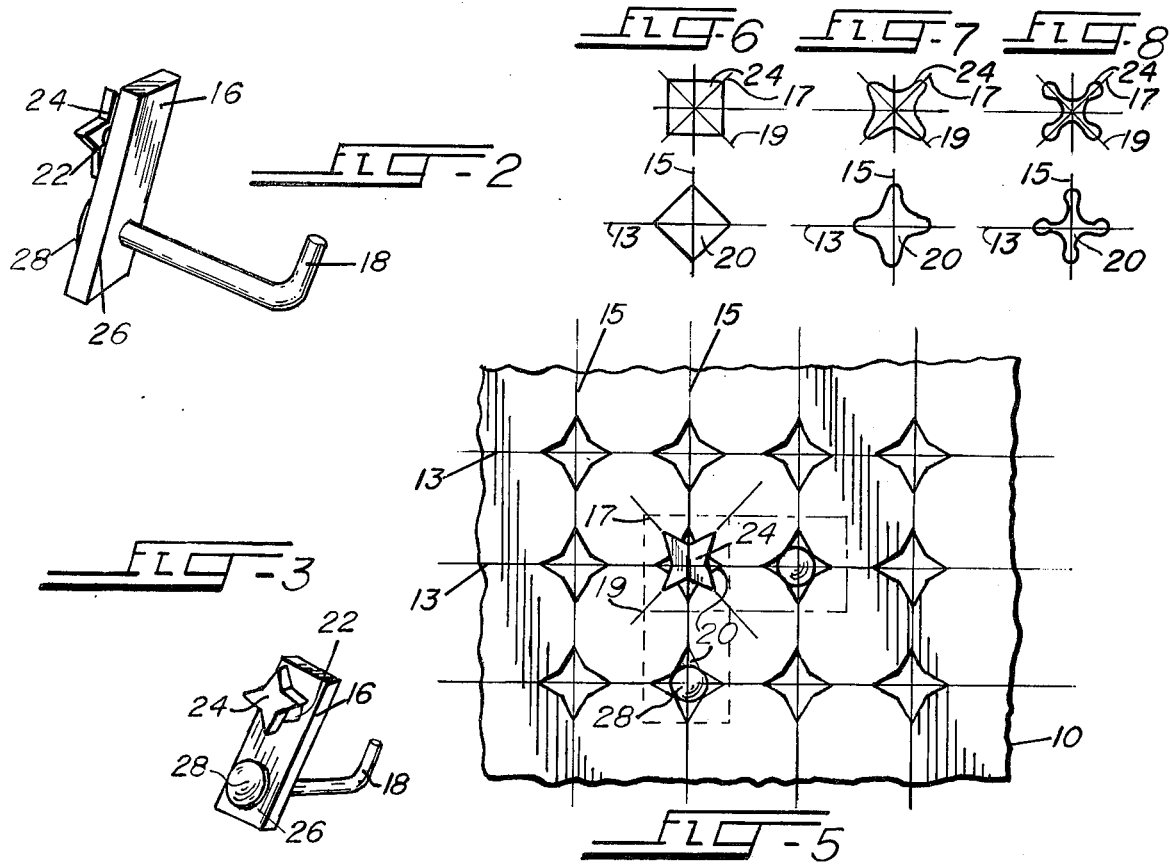

3,880,390

UNIVERSAL PEGBOARD

BACKGROUND OF THE INVENTION

This invention relates to display boards and in particular to apertured pegboards. Apertured boards generally comprise a sheet of resin-bonded wood chips or other synthetic composition. A plurality of holes are formed therein, the holes generally being of 3/16 inch diameter, and hooks and various clamps to support the display are hung therein. The hooks are usually formed of ⅛ inch steel wire.

A common fault of this type installation is that the hooks have a very short arcuate engagement to permit them to pass through the hole. Any slight jarring tends to dislodge or loosen the hooks making them very insecure.

Another type pegboard mounts a wedge locking bracket and includes a locking pin without the universal feature. The difficulty with this installation lies in the locking pin which only loosely locks and does not frictionally fix the peg in the pegboard. Lateral support to the peg is maintained by a large flanged element around the base of the peg for bearing against the pegboard.

There is thus an established need for a pegboard with a universal mount for the peg which is frictionally fixed and laterally supported therein.

SUMMARY OF THE INVENTION

A pegboard for bayonet mounting of pegs having apertures of non-circular cross-section shaped about two principal planes of symmetry mutually orthogonally placed, said apertures arranged in uniformly spaced geometrical relation on the pegboard having principal planes in parallel relation thereon and arranged in mutually orthogonal rows and columns, said pegboard mounting a peg in the aperture thereon having a base block and a lock block on the head end thereof, said lock block haaving a geometrical shape similar to but slightly smaller than that of the aperture therein for insertion in and through said aperture, said lock block mounted on a cylindrical shank of a diameter smaller than the smallest inside dimension of the aperture and spaced from the base block by a distance only slightly greater than the thickness of the pegboard, said peg combined with a detent device mounted on said lock block and offset from said peg for frictionally fixing and laterally supporting the peg in the pegboard, said detent device spaced from the peg by a distance equal to the distance between the rows and columns on the pegboard, said detent device comprising a spherically ended stud having a diameter slightly greater than the smallest inside dimension of the aperture and extending out of the pegboard in the same direction as the peg therefrom.

DESCRIPTION OF THE DRAWINGS

FIG. 1 shows a fragmented perspective view of the front mounting face of a pegboard with two pegs mutually orthogonally mounted in apertures thereon;

FIG. 2 shows a front perspective view of the peg mounted on the lock block with a detent device thereon;

FIG. 3 shows a rear perspective view of the peg mounted on the lock block with the detent device thereon;

FIG. 4 shows a fragmented cross-section of the pegboard with a peg mounted thereon along line 2—2 of FIG. 1;

FIG. 5 shows a fragmented back face view of the pegboard; and

FIGS. 6, 7 and 8 show optional shapes of the lock blocks on the pegs, and the apertures in the pegboard.

DESCRIPTION OF THE PREFERRED EMBODIMENT

With reference to FIG. 1, an apertured pegboard 10 mounts a first peg 12 in vertical position and a second peg 14 in horizontal position thereon. A base block 16 forms the structural backing for mounting on the pegboard 10. A hook 18 mounts to the front face of base block 16 for supporting the particular display. Star-shaped bayonetting apertures 20 are uniformly spaced in geometrical array equidistant from each other in orthgonal directions and have principal axes in mutually orthogonal rows 13 and columns 15 at right angles thereto on the pegboard 10 for the insertion of the pegs 12 and 14 therein.

A cylindrical shank 22 fixedly mounts adjacent to the upper end of the back face of the base block 16, as shown in FIGS. 2 and 3, spaced along the length near the top end thereof and extending therefrom in a backward direction. A lock block 24 mounts on the outer end of the shank 22 spaced from the back face of the base block 16 by a distance only slightly greater than the thickness of the pegboard 10, as shown in FIG. 4, and having a shape which is geometrically similar to but only slightly smaller than the star-shaped aperture 20. Principal axes 17 and 19 lie in mutually orthogonal relation on the lock block 24 in a 45° angle relation to principal axes 13 and 15 of the apertures 20 when the pegs 12 and 14 are installed and bayonetted in the pegboard 10.

In the bayonet mounting of the pegs 12 and 14 on the board 10, the star-shaped lock block 24 is inserted in the geometrically similar aperture 20 by lining up the male shape of the lock block 24 and sliding it through the geometrically similar female shape of the aperture 20 until the lock block 24 clears the back face of the board 10 and the base block 16 is flush up against the front face thereof, as shown in FIG. 4. Upon full insertion thus, the base block 16 is then rotated in bayonet action by an angle 45° in either a clockwise or counterclockwise direction to lock the pegs 12 and 14 in the board 10 against the back face thereof in the particular orthogonal orientation desired, as shown in FIG. 5.

A lower extension 26 of the base block 16, as shown in FIGS. 1, 2, 3 and 4, extends from the shank 22 at the end thereon in the direction of either orthogonal row 13 or column 15 of apertures 20 in the board 10 depending upon the orientation chosen for the mounting of the pegs 12 and 14 thereon. A slightly spherical-ended stud 28 having a diameter slightly larger than the smallest dimension across the aperture 20 mounts on the base block 16 on the end opposite the end mounting the shank 22 thereof spaced therefrom a distance equal to the space between rows 13 or columns 15 and extending out from the back face thereof in the same direction as the pegs 12 and 14 with their cylindrical shanks 22 and lock blocks 24 mounted thereto.

In the mounting one of the pegs 12 and 14 on the board 10, the initial line-up of the lock block 24 with an aperture 20 does not initially register the spherical-ended stud 28 with an adjacent aperture. An aperture 20 in the adjacent row 13 or column 15 registers with the stud 28 only after bayonet locking of the respective peg therein by rotation of the base block 16 through an angle of 45° in either direction because the rounded stud or button 28 is larger than the smallest diameter of an aperture 20, such direct registry of the end of stud 28 with an aperture in an adjacent row 13 or column 15, as the case may be, engages the stud 28 on the board 10 with a wedging action which tensions the base block outwardly from the board 10 and frictionally locks the peg against disengagement therefrom without the use of positive effort on the part of the person removing the pegs 12 and 14 from the board 10.

Lock blocks 24 and apertures 20, as shown in FIGS. 6, 7 and 8, are examples of geometrical shapes having bayonetting utility for mounting pegs 12 and 14 to the pegboard 10.

It will be understood that details of the construction shown may be altered or omitted without departing from the spirit of the invention as defined by the following claims.

I claim:

1. A peg and universal pegboard for mounting a display having a detent-secured bayonet mount comprising:

a. equally spaced rows and columns of a multiplicity of non-circular apertures in said pegboard having mutually identical principal planes of symmetry in orthogonal directions, b. an elongate base block having a shank extending from its back face adjacent one end thereof, c. a lock block mounted on the end of the shank spaced from the back face of the base block by a distance slightly greater than the thickness of the pegboard and having a shape geometrically similar to but slightly smaller than that of the apertures, and d. a detent means comprising a stud extending from the back face of the base block and having a rounded end of a diameter larger than the smallest dimension across an aperture in the plane thereof, said stud being spaced from the shank along the length of the base block by a distance equal to the distance between the rows and columns of said apertures.

* * * * *